United States Patent [19]

Nakane et al.

[11] Patent Number: 4,959,404

[45] Date of Patent: Sep. 25, 1990

[54] THERMOPLASTIC RESIN COMPOSITION

[75] Inventors: Toshio Nakane, Fuji; Yukihiko Kageyama, Fujinomiya; Kenji Hijikata, Mishima, all of Japan

[73] Assignee: Polyplastics Co., Ltd., Osaka, Japan

[21] Appl. No.: 266,800

[22] Filed: Nov. 3, 1988

[30] Foreign Application Priority Data

Dec. 4, 1987 [JP] Japan .................................. 62-307198

[51] Int. Cl.$^5$ .............................................. C08K 5/54
[52] U.S. Cl. ...................................... 524/267; 524/35; 524/462; 524/490; 525/440; 525/446; 525/453; 525/464; 525/100; 525/104; 525/105; 525/106; 525/398; 528/27; 528/29
[58] Field of Search ................... 528/27, 29; 525/446, 525/440, 453, 464, 398, 100, 104, 105, 106; 524/35, 490, 462, 267

[56] References Cited

U.S. PATENT DOCUMENTS

| | | | |
|---|---|---|---|
| 4,683,271 | 7/1987 | Lin et al. | 525/446 |
| 4,754,014 | 6/1988 | Ryntz et al. | 528/27 |
| 4,806,594 | 2/1989 | Gross et al. | 525/106 |

*Primary Examiner*—Melvyn I. Marquis
*Attorney, Agent, or Firm*—Nixon & Vanderhye

[57] ABSTRACT

A thermoplastic resin composition comprises a resin dispersion which includes a thermoplastic resin component having a solubility parameter $\delta$ of at least 9.5 cal$^{\frac{1}{2}}$ cm$^{-3/2}$, a modifier component having a solubility parameter $\delta$ of not higher than 8.5 cal$^{\frac{1}{2}}$ cm$^{-3/2}$, and a dispersibility improver comprising a silicon-containing polyacetal copolymer having (i) a siloxane segment derived from 0.01 to 30 wt. % of a terminal-reactive silicone oil of the following general formula I:

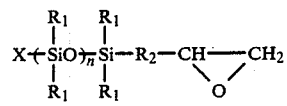

[I]

wherein $R_1$ represents an alkyl or phenyl group, $R_2$ represents a divalent organic group, X represents a group selected from the group consisting of —NH$_2$, —OH,

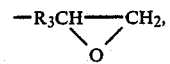

—R$_4$OH, —R$_5$COOH, —R$_6$COOR$_7$, —R$_8$ and —OR$_9$, R$_3$ represents a divalent organic group, R$_4$ to R$_6$ each represent an alkylene group having 1 to 10 carbon atoms, R$_7$ to R$_9$ each represent an alkyl group having 1 to 10 carbon atoms and n represents a number between 5 to 10.

4 Claims, No Drawings

THERMOPLASTIC RESIN COMPOSITION

FIELD OF INVENTION

The present invention relates to a synthetic resin composition, and more particularly, to a thermoplastic resin composition. In preferred embodiments, the present invention relates to a thermoplastic resin composition exhibiting increased toughness and excellent abrasion resistance properties which include an essentially non-dispersible modifier which is caused to be homogeneously dispersed in the resin composition by the presence of a dispersibility-improving siloxane copolymer.

BACKGROUND AND SUMMARY OF THE INVENTION

Engineering plastics such as polyacetal resins; aromatic thermoplastic polyesters such as polyethylene terephthalate and polybutylene terephthalate; thermoplastic polyamides such as nylon 6 and nylon 6,6; and polyesteramides which are copolymers of the above-mentioned polymers are widely used as resins due to their excellent tensile strength, tear strength, resilience cold resistance and bending resistance. Attempts have been made, however, to add various substances to these resins to form a composition having modified properties and improved functions. It is known, for example, that when a solid filler is employed, coupling agents and some surfactants are also needed in order to improve the compatibility of the filler's surface with the matrix resin so as to obtain a homogeneous dispersion of the former in the latter However, when the modifiers are resins or liquid substances having solubility parameters δ which are different from one another, their compatibility with one another is sufficiently poor so that homogeneous dispersions cannot be obtained in many cases.

In such a situation, conventional coupling agents are useless. In addition, ordinary surfactants have poor heat stability and are therefore unsuitable for use as an additive in engineering plastics, which necessitate processing at high temperatures. Particularly, when an oily substance or the like is to be dispersed in a resin, it cannot be used in large amounts since it would otherwise separate from the resin (i.e., "bleed"). Even when an oily substance is used in small amounts, problems ensue such as the inability to form homogeneous dispersions, poor product appearance non-uniform physical properties, reduced mechanical strength. Moreover, when polymers are blended together, problems similar to those encountered with use of oily substance ensue, such as non-uniform dispersions creation of a surface peeling phenomenon, and non-uniform mechanical strengths.

Techniques to solve these problems have been proposed. For one example, technique involves using a block copolymer having a segment which is the same as that of the substance to be dispersed in the matrix resin. Another technique involves using components that may be chemically bonded together by, for example, an exchange reaction, so as to improve the components surface affinities. However, these techniques lack versatility because the number of suitable components that may be employed is limited. That is, a number of available components cannot be used according to these techniques and thus different formulations are necessary depending upon the components that are employed.

An object of the present invention is to provide a thermoplastic resin composition exhibiting increased toughness and excellent abrasion resistance, which is prepared by melt-blending so as to obtain a homogeneous dispersion without causing bleeding and/or without reducing the composition's mechanical and physical properties.

The present invention is based upon the discovery that specified siloxane copolymers (to be discussed in detail below) are not decomposed at high temperatures, and exhibit a desirable surface-activating effect so that they can be used as a compatibilizing agent for a number of components to be incorporated into a resin composition. These siloxane copolymers thus form a homogeneous dispersion even when components are used having significantly different solubility parameters as compared to the solubility parameter of the siloxane copolymers.

DETAILED DESCRIPTION OF THE INVENTION

The present invention relates to a thermoplastic resin composition comprising a resin dispersion which includes a thermoplastic resin (A) having a solubility parameter $\delta$ of at least $9.5 \text{ cal}^{\frac{1}{2}}\text{cm}^{-3/2}$ and a modifier (B) having a solubility parameter $\delta$ of not higher than $8.5 \text{ cal}^{\frac{1}{2}}\text{cm}^{-3/2}$. The compositions of this invention are particularly characterized by containing a dispersibility improver (C) comprising a silicon-containing polyacetal copolymer which includes a siloxane segment derived from between 0.01 to 30 wt. % of a terminal-reactive silicone oil of the following general formula [I]:

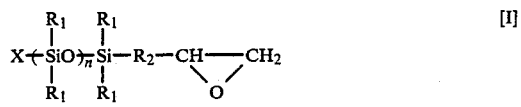

wherein $R_1$ represents an alkyl or phenyl group, $R_2$ represents a divalent organic group, X represents a group selected from the group consisting of $-NH_2$, $-OH$,

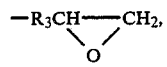

$-R_4OH$, $-R_5COOH$, $-R_6COOR_7$, $-R_8$ and $-OR_9$, $R_3$ represents a divalent organic group, $R_4$ to $R_6$ each represent an alkylene group having 1 to 10 carbon atoms, $R_7$ to $R_9$ each represent an alkyl group having 1 to 10 carbon atoms and n represents a number between 5 to 10, and between 99.99 to 70 wt. % of a polyacetal segment covalently bonded to the silicon-containing segment. The degree of polymerization of the siloxane segment (n in the formula [I]) is 5 to 1,000 and the degree of polymerization of the polyacetal segment is 5 to 2,000. Moreover, the weight ratio of (A) to (B) is 99.9 to 85/0.1 to 15 and the amount of (C) is 0.01 to 5 parts by weight for 100 parts by weight in total of (A) and (B).

The polyacetal segment (C) employed in the compositions of this invention include polyoxymethylene units as the main skeleton. They may be either homopolymers formed by polymerizing formaldehyde or trioxane, or copolymers comprising units derived from formaldehyde or trioxane as the main component and units derived from one or more comonomers selected from among cyclic ethers and cyclic formals such as ethylene oxide, propylene oxide, oxetane, dioxolane, dioxepane, trioxepane and formal of butanediol.

The silicon-containing polyacetal copolymers (C) are prepared by known polyacetal polymerization processes, such as copolymerizing a terminal-reactive silicone oil of the general formula [I] in an amount of at least 0.01 wt. %, based on the total reactive monomers, with formaldehyde or trioxane under heat in the presence of a catalyst. Alternately, formaldehyde or trioxane as the main component may be copolymerized with one or more comonomers selected from the group consisting of cyclic ethers and cyclic formals such as ethylene oxide, propylene oxide, oxetane, dioxolane, dioxepane trioxepane and the formal of butanediol in the presence of the terminal-reactive silicone oil of the general formula [I] under heat in the presence of a catalyst. Paraformaldehyde can also be used as a source of formaldehyde during the copolymerization.

The terminal-reactive silicone oils used in the present invention are those represented by the above general formula [I]. They are used either alone or in combination of two or more.

When X in the above general formula [I] is a group other than

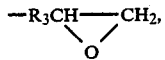

the copolymer obtained is a block copolymer or a comblike graft copolymer.

When X is

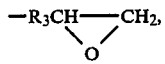

namely when the silicone oil has glycidyl groups at both ends, a graft copolymer comprising polyacetal segments crosslinked with a siloxane segment is obtained. A particularly preferred silicone oil is a polydimethylsiloxane diglycidyl ether of the general formula [I] wherein $R_1$ represents a methyl group and $R_2$ and $R_3$ each represent $-CH_2-$, $-OCH_2-$, $-CH_2CH_2OCH_2-$ or the like which has a degree of polymerization of 5 to 1,000, preferably 10 to 500.

In the formula [I], it is preferable that an alkyl for $R_1$ has 1 to 4 carbon atoms, especially 1 or 2, more preferably methyl; $R_2$ is $-R_9-Y-R_{10}$, $R_9$ a $R_{10}$ being a $C_1$ to $C_6$ alkyl, Y being oxygen or sulfur, a $C_1$ to $C_{12}$ alkylene or a $C_1$ to $C_{12}$ oxyalkylene; $R_3$ is the same as $R_2$.

The weight ratio of the above-described terminal-reactive silicone oil to the monomer constituting the polyacetal segment is 0.01 to 30/99.99 to 70, preferably 0.02 to 20/99.98 to 80.

The silicon-containing polyacetal copolymer (C) of the present invention is produced under the same conditions as those of known processes for producing polyacetals in the presence of the same catalyst as that of the latter processes In a particularly preferred embodiment of the process, trioxane as the main monomer is reacted with a small amount of a cyclic ether or a cyclic formal as the comonomer and polydimethylsiloxane diglycidyl ether in the presence of a cationic active catalyst such as boron trifluoride or a complex compound thereof at 60° to 150° C.

A known polymerization regulator such as dimethyl acetal can be used in the production of the silicon-containing polyacetal copolymer (C) within the scope of the present invention.

The solubility parameter δ is widely employed as a means to evaluate the compatibility of polymers. This method is described in detail in many books (see, for example, "Polymer Handbook", the Second Edition, IV, page 349).

As is well known, δ represents the cohesive strength of molecules of the same compound In a mixture which satisfies the following formula [II]:

$$|\delta_1 - \delta_2| \simeq 0 \qquad (II)$$

wherein $\delta_1$ and $\delta_2$ represent solubility parameters of different substances, swelling or dissolution occurs when the mixture comprises a combination of a high-molecular compound and a low-molecular compound, and stable dispersions are maintained by mechanical stirring when the mixture comprises a combination of high molecular compounds. In both mixtures, the affinity is strong and any phase separation phenomenon rarely occurs. When the value of the formula [II] exceeds 1, a phase separation phenomenon usually occurs so that stable, homogeneous dispersions cannot be obtained easily.

An object of the present invention is to make it possible to effectively prepare a homogeneous dispersion comprising at least a substance (A) having δ of at least 9.5 cal$^{\frac{1}{2}}$cm$^{-3/2}$ with a substance (B) having δ not higher than 8.5 cal$^{\frac{1}{2}}$cm$^{-3/2}$.

The components (A) having δ of at least 9.5 cal$^{\frac{1}{2}}$cm$^{-3/2}$ used in the present invention are thermoplastic resins selected from the group consisting of, for example, polyesters, polyamides, polyesteramides, polyurethanes, polyvinyl chloride, polycarbonates, polyvinylidene chloride, polyacrylonitrile, polyacetals, polymethacrylonitrile, polymethyl acrylate, polyvinyl alcohol, celluloses and derivatives of them. They may be used either singly or in combinations of two of more.

Polyacetals, polyesters, polyamides, polyesteramides and polyurethanes are particularly preferred.

Most preferred are homopolymers and copolymers comprising polyoxymethylene units as the main skeleton.

The modifiers (B) having a solubility parameter δ of not higher than 8.5 cal$^{\frac{1}{2}}$cm$^{-3/2}$ are one or more homopolymers selected from the group consisting of polytetrafluoroethylene, polyvinylidene chloride, polychlorotrifluoroethylene, fluororubber, polydimethylsilicone, polyalkylsiloxanes, polyphenylsiloxane silicone rubber butyl rubber polyisodispersion polyethylene, ethylene-/propylene rubber and polypropylene and/or a copolymer comprising at least one of the monomer units forming these polymers as the constituent. The modifiers (B) are preferably fluorocarbon oil, silicone oil and mineral oil having a molecular weight of not higher than 200,000.

The ratios of the components of the composition of the present invention are as follows: the weight ratio of (A) to (B) is not particularly limited provided that the component (B) is substantially present even in a very small amount. Usually the ratio of (A) to (B) is 99.9 to 85/0.1 to 15. The amount of the component (C) is 0.01 to 5 parts by weight, particularly preferably 0.1 to 2 parts by weight, per 100 parts by weight in total of components (A) and (B).

When the amount of the component (B) is less than the above-described range, the characteristic features of the modifier cannot be easily obtained. On the contrary, when it exceeds that range, the physical properties of the resin component (A) are excessively modified thereby unfavorably affecting the homogeneous dispersion thereof. When the amount of the component (C) is insufficient, satisfactory homogeneous dispersibility cannot be obtained.

The resin compositions of the present invention can be homogeneously mixed and dispersed with ordinary apparatus for dissolving and kneading thermoplastic resins, such as an extruder, and can be easily molded with molding machines by conventional methods.

The composition of the present invention is produced by mixing a synthetic resin with another substance having a $\delta$ (cal$^{\frac{1}{2}}$cm$^{-3/2}$) value different from that of the synthetic resin (and therefore having low dispersibility in the resin), in the presence of a special siloxane copolymer (C) to form a homogeneous dispersion. By this process, compounds having a $\delta$ value of less than 8.5 cal$^{\frac{1}{2}}$cm$^{-3/2}$ and substantially incompatible with the base polymer can be quite easily dispersed and component "bleeding" during and/or after the molding can be prevented. Furthermore, high toughness and abrasion resistance can be imparted to the moldings without causing any surface peeling phenomenon. The thermoplastic resin compositions of the present invention having excellent properties can therefore be used for a number of end-use applications. Namely, they are usable as structural materials such as outside plates of automobiles for which excellent physical and mechanical properties (such as impact resistance) are required, and as materials for parts of precision instruments, such as key tops and gears, as well as electric components which require excellent abrasion resistance and sliding resistance properties.

EXAMPLES

The following Examples will further illustrate the present invention. Referential Examples of the processes for producing the Polymer (C) containing a siloxane segment will be also given.

Referential Example 1

0.02 part by weight of polydimethylsiloxane diglycidyl ether [number-average degree of polymerization: about 25] having glycidyl groups at both ends as the terminal-reactive silicone oil was added to a mixture of 98 parts by weight of trioxane with 2 parts by weight of ethylene oxide. The mixture was heated to 65° C. under thorough stirring. Then a given amount of boron trifluoride/ethyl ether complex was added thereto and the polymerization was conducted at 60° to 100° C.

As the polymerization proceeded, the reaction system became milky and solidified. After 40 minutes, an aqueous alcohol solution containing a small amount of triethylamine was added thereto to terminate the reaction. The product was pulverized and thrown into acetone containing a small amount of triethylamine to wash it thoroughly. The product was air dried and stabilized in the same manner as that employed in the production of the polyacetal resin.

Referential Example 2

The same procedure as that of Referential Example 1 was repeated except that 3 parts by weight of polydimethylsiloxane diglycidyl ether [number-average degree of polymerization: about 50] having glycidyl groups at both ends as the terminal-reactive silicone oil was added to a mixture of 98 parts by weight of trioxane with 2 parts by weight of ethylene oxide to prepare a silicon-containing polyacetal copolymer.

Referential Example 3

The same procedure as that of Referential Example 1 or 2 was repeated except that 3 parts by weight of polydimethylsiloxane monoglycidyl ether [number-average degree of polymerization: about 500] having a methyl group at an end (X) as the terminal-reactive silicone oil was added to a mixture of 98 parts by weight of trioxane with 2 parts by weight of ethylene oxide to give a silicon-containing polyacetal copolymer.

Referential Example 4

The same procedure as that of Referential Example 3 was repeated except that 97 parts by weight of trioxane, 3 parts by weight of dioxolane and 10 parts by weight of the same silicone oil as that used in Referential Example 3 were used to give a silicon-containing polyacetal copolymer.

Referential Example 5

The same procedure as that of the above-described Referential Examples was repeated except that 97 parts by weight of trioxane, 3 parts by weight of dioxolane and 20 parts by weight of polydimethylsiloxane monoglycidyl ether [number-average degree of polymerization: about 300] having —OCH$_3$ at an end (X) as the terminal-reactive silicone oil were used to give a silicon-containing polyacetal copolymer.

Example 1 and Comparative Example 1

A polyacetal resin (POM) (Duracon M90; a product of Polyplastics Co.) as the component (A), a silicone oil (SH-200; a product of Toray Silicone Co.) as the component (B) and a silicon-containing polyacetal copolymer prepared in Referential Example 1, 2 or 3 as the component (C) were kneaded together each in an amount shown in the following table with an extruder at 220° C. The composition was thus pelletized. The pellets were freeze-broken with liquid nitrogen The fracture of the obtained resin composition was observed with a scanning electron microscope to find out that the silicon oil was homogeneously dispersed. The resin composition was injection-molded to form test pieces. After leaving the test pieces to stand at 80° C. for one month, no bleeding of the oil was substantially observed on the surface The coefficient of dynamic friction was determined according to ASTM D 1894. The test pieces having a size of 100×25×3 mm were repeatedly bent at an angle of 90° at room temperature according to JIS Z-2248, the internal bending radius being 1 mm. Even after repeating the bending 24 times, no delamination was observed on the bent surface The same test pieces as above were subjected to extraction with acetone at room temperature for 1 h. The results are shown in the following table.

The same composition as that of Example 1 except that no component (C) was contained was prepared and the test pieces thereof were subjected to the same test as above. The bleeding of the oil was recognized on the surfaces of the test pieces. The results are also shown in the following table.

Examples 2 and 3 and Comparative Example 2

The same procedure as that of Example 1 was repeated except that the silicone oil used as the component (B) was replaced with fluorocarbon oil or polytetrafluoroethylene (PTFE) and that the silicon-containing polyacetal copolymer prepared in Referential Example 4 was used as the component (C). The dispersibility was excellent and the bleeding on the surface was scarcely observed. Other results are shown in the following table.

The same procedure as that of Example 3 was repeated except that the composition free of the silicon-containing polyacetal copolymer was used. The results are shown in the following table as those of Comparative Example 2.

Examples 4 to 6 and Comparative Example 3

The same procedure as above was repeated except that polybutylene terephthalate (PBT) was used as the base polymer, i.e. component (A), the same substance as that used in Example 1, 2 or 3 was used as the component (B) and the silicon-containing polyacetal copolymer prepared in Referential Example 5 was used as the component (C) [in Comparative Example 3, the same procedure as in Example 4 was repeated except that no component (C) was used]. As for the effects of them, the homogeneous dispersion could be obtained in all the cases excluding that of Comparative Example 3. Other results are shown in the following table

Example 7 and Comparative Example 4

An epoxy resin hardener (Tohmide#255; a product of Fuji Kasei Co.) as the component (A) was heated to melt together with the silicon-containing polyacetal copolymer prepared in Referential Example 4 as the component (C) to form a homogeneous dispersion, which was left to cool An epoxy resin (Epikote #828; a product of Yuka Shell Co.) as the component (A) and a silicone oil (Silicone Oil SH-200; a product of Toray Silicone Co.) as the component (B) were added to the dispersion and they were thoroughly mixed. The mixture was cast and hardened at 100° C. for 3 h. The characteristic values of the hardened product are also shown in the following table.

The epoxy resin was hardened under the same conditions as in Example 4 except that the silicon-containing polyacetal copolymer as the component (C) was not used and the characteristic values thereof were determined. The results are shown in the following table.

TABLE

Examples and Comparative Examples

| | A (parts by wt.) | | B (parts by wt.) | | Silicon-containing copolymer (C) (parts by wt.) | Coefficient of dynamic friction | Bending test (Note-1) | Amount of oil extracted with solvent (%) (Note-2) |
|---|---|---|---|---|---|---|---|---|
| Ex. 1 | POM | (94.5) | silicone oil | (4) | Ref. Ex. 1 (1.5) | 0.07 | | 0.8 |
| | " | (95.5) | " | (4) | Ref. Ex. 2 (0.5) | 0.08 | | 0.9 |
| | " | (95.5) | " | (4) | Ref. Ex. 3 (0.5) | 0.07 | | 0.7 |
| Comp. Ex. 1 | POM | (96.0) | silicone oil | (4) | — | 0.13 | x | 36.8 |
| Ex. 2 | POM | (95.5) | fluorocarbon oil | (4) | Ref. Ex. 4 (0.5) | 0.07 | | 2.1 |
| Ex. 3 | POM | (91.0) | PTFE | (8) | Ref. Ex. 4 (1.0) | 0.08 | Δ | — |
| Comp. Ex. 2 | POM | (92.0) | PTFE | (8) | — | 0.09 | x | — |
| Ex. 4 | PBT | (91.5) | silicone oil | (8) | Ref. Ex. 5 (0.5) | 0.13 | | 0.9 |
| Ex. 5 | PBT | (91.5) | fluorocarbon oil | (8) | Ref. Ex. 5 (0.5) | 0.11 | | 0.7 |
| Ex. 6 | PBT | (91.5) | PTFE | (8) | Ref. Ex. 5 (0.5) | 0.13 | | 1.0 |
| Comp. Ex. 3 | PBT | (92.0) | silicone oil | (8) | — | 0.17 | x | 27.4 |
| Ex. 7 | Epikote | 828 (67.8) | silicone oil | (8) | Ref. Ex. 4 (0.5) | 0.16 | Δ | 1.1 |
| | Tohmide | 255 (23.7) | | | | | | |
| Comp. Ex. 4 | Epikote | 828 (67.8) | silicone oil | (8) | — | 0.24 | x | 17.9 |
| | Tohmide | 255 (23.7) | | | | | | |

Note-1
The results of the bending tests were classified into three ranks by the visual observation of delamination on the bent surface.
  : No delamination on the surface.
Δ: The surface was peeled and cracks were formed.
x: Breakage was caused in 24 times bending test or a part of the test piece was broken.
Note-2
Amount of extracted oil (%) based on the component (B) used.

We claim:

1. A thermoplastic resin composition comprised of a homogeneous resin dispersion which comprises (A) a thermoplastic resin component having a solubility parameter of at least 9.5 cal$^{\frac{1}{2}}$cm$^{-3/2}$ and being at least one thermoplastic resin selected from the group consisting of polyester, polyamide, polyesteramide, polyurethane, polyvinyl chloride, polycarbonate, polyacetal, polyvinylidene chloride, polyacrylonitrile, polymethacrylonitrile, polymethyl acrylate, polyvinyl alcohol, cellulose and their derivatives, (B) a modifier component having a solubility parameter of not greater than 8.5 cal$^{\frac{1}{2}}$cm$^{-3/2}$ and being at least one polymer selected from the group consisting of homopolymers or copolymers of polytetrafluoroethylene, polyvinyldiene chloride, polychlorotrifluoroethylene, fluororubber, polyalkylsiloxane, polyphenylsiloxane, butyl rubber, polyisobutylene, polyethylene, ethylene/propylene rubber and polypropylene, and (C) a dispersibility improver, wherein said dispersibility improver is comprised of a silicon-containing polyacetal copolymer having (i) a siloxane segment derived from between 0.01 to 30 wt. % of a terminal-reactive silicone oil of the following general formula I:

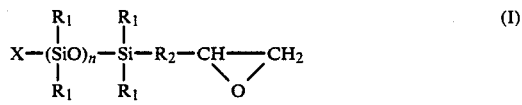

wherein $R_1$ represents an alkyl or phenyl group, $R_2$ represents a divalent organic group, X represents a group selected from the group consisting of $-NH_2$, $-OH$,

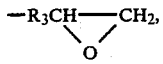

$-R_4OH$, $-R_5COOH$, $-R_6COOR_7$, $-R_8$ and $-OR_9$, where $R_3$ represents a divalent organic group, $R_4$ to $R_6$ each represent an alkylene group having 1 to 10 carbon atoms, $R_7$ to $R_9$ each represent an alkyl group having 1 to 10 carbon atoms and n represents a number between 5 to 10, and (ii) between 99.99 to 70 wt. % of polyacetal segment covalently bonded to said siloxane segment wherein the degree of polymerization of the siloxane segment is between 5 to 1,000, and the degree of polymerization of the polyacetal segment is between 5 to 2,000 and wherein the weight ratio of thermoplastic resin component to the modifier component is 99.9 to 85/0.1 to 15, and the amount of the dispersibility improver is between 0.01 to 5 parts by weight per 100 parts by weight in total of the thermoplastic resin component and the modifier component.

2. A thermoplastic resin composition according to claim 1, wherein the polyacetal is a homopolymer or copolymer comprising polyoxymethylene units as the main polymer skeleton.

3. A thermoplastic resin composition according to claim 1 or 2, wherein the modifier component (B) is a fluorocarbon oil, a silicone oil or a mineral oil having a molecular weight of 200,000 or less.

4. A thermoplastic resin composition as in claim 1, wherein said modifier component is polydimethylsilicone or silicone rubber.

* * * * *

UNITED STATES PATENT AND TRADEMARK OFFICE
CERTIFICATE OF CORRECTION

PATENT NO. : 4,959,404

DATED : September 25, 1990

INVENTOR(S) : Nakane et al

It is certified that error appears in the above-identified patent and that said Letters Patent is hereby corrected as shown below:

Column 1, line 24, after "resilience" insert --,--;
        line 33, after "latter" insert --.--;
        line 49, after "appearance" insert --,--;
        line 50, after "properties" insert --and/or--;
        line 52, change "substance" to --substances--;
        line 57, after "For" delete "one" and after "example" insert --one--.

Column 4, line 9, change "In" to --in--.

Column 5, line 43, change "be also" to --also be--.

Signed and Sealed this

Twenty-eighth Day of April, 1992

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,959,404

DATED : September 25, 1990

INVENTOR(S) : NAKANE et al

It is certified that error appears in the above-identified patent and that said Letters Patent is hereby corrected as shown below:

On the title page, item [57]:

Abstract, second column, last line, after "to" delete "10" and insert --1,000--.

Column 2, line 53, after "to" delete "10" and insert --1,000--.

Column 9, line 15, after "to" delete "10" and insert --1,000--.

Signed and Sealed this

Ninth Day of November, 1993

Attest:

BRUCE LEHMAN

*Attesting Officer*  *Commissioner of Patents and Trademarks*